US008428034B2

United States Patent
Mandin

(10) Patent No.: US 8,428,034 B2
(45) Date of Patent: Apr. 23, 2013

(54) ENCODING FOR EFFICIENT USE OF AN UPSTREAM CHANNEL IN BURST MODE

(75) Inventor: Jeff Mandin, Jerusalem (IL)

(73) Assignee: PMC-Sierra Ltd., Herziliya Pituach (IL)

( * ) Notice: Subject to any disclaimer, the term of this patent is extended or adjusted under 35 U.S.C. 154(b) by 1133 days.

(21) Appl. No.: 12/026,570

(22) Filed: Feb. 6, 2008

(65) Prior Publication Data

US 2008/0212560 A1 Sep. 4, 2008

Related U.S. Application Data

(60) Provisional application No. 60/888,325, filed on Feb. 6, 2007.

(51) Int. Cl.
*H04B 7/216* (2006.01)
*H04J 3/00* (2006.01)
*H04W 72/00* (2009.01)

(52) U.S. Cl.
USPC ............ 370/335; 370/320; 370/337; 455/450

(58) Field of Classification Search .................. 370/335
See application file for complete search history.

(56) References Cited

U.S. PATENT DOCUMENTS

| | | | |
|---|---|---|---|
| 6,650,649 B1 * | 11/2003 | Muhammad et al. ......... | 370/402 |
| 7,050,419 B2 * | 5/2006 | Azenkot et al. ............... | 370/347 |
| 7,528,747 B2 * | 5/2009 | Baumer ......................... | 341/95 |
| 7,602,318 B1 * | 10/2009 | James .............................. | 341/58 |
| 7,782,805 B1 * | 8/2010 | Belhadj et al. ................ | 370/300 |
| 7,835,314 B2 * | 11/2010 | Yee et al. .................... | 370/310.1 |
| 2004/0264961 A1 * | 12/2004 | Nam et al. ....................... | 398/58 |
| 2007/0103344 A1 * | 5/2007 | Baumer ........................... | 341/50 |
| 2009/0146852 A1 * | 6/2009 | Diab .............................. | 341/100 |

OTHER PUBLICATIONS 802.3™"*Part 3: Carrier sense multiple access with collision detection (CSMA/CD) access method and physical layer specifications*" Section Five. IEEE Computer Society. Dec. 2005.
"*Gigibit-capable Passive Optical Networks (G-PON): General characteristics*" International Telecommuication Union G.984.1, Mar. 2003.
"*Gigibit-capable Passive Optical Networks (G-PON): Physical media Dependent (PMD) layer specification*" International Telecommuication Union G.984.2, Mar. 2003.
"*Gigibit-capable Passive Optical Networks (G-PON): Transmission convergence layer specification*" International Telecommuication Union G.984.3, Mar. 2003.

* cited by examiner

*Primary Examiner* — Guang Li
(74) *Attorney, Agent, or Firm* — Mark M. Friedman

(57) ABSTRACT

Alignment-enabled secondary nodes of a DAMA network monitor the alignment of for-transmission data as it is received, and actively align the data frames into encoded blocks such that the number of blocks occupied by encoded data resulting from an unencoded datastream of a particular length is predictable rather than variable. In some embodiments, the network is an Ethernet passive optical network and the alignment includes aligning a XGMII word having a start control code to a first position in a 72 bit word input to a 66B/66B encoder, thereby encoding a start-of-frame (/S/) code to a first byte of an encoded first Ethernet 66b block.

10 Claims, 9 Drawing Sheets

FIG. 1 PRIOR ART

| Input Data | Sync | Block Payload | | | | | | | |
|---|---|---|---|---|---|---|---|---|---|
| Bit Position: | 0 1 2 | | | | | | | | 65 |
| Data Block Format: | | | | | | | | | |
| $D_0 D_1 D_2 D_3 D_4 D_5 D_6 D_7$ | 01 | $D_0$ | $D_1$ | $D_2$ | $D_3$ | $D_4$ | $D_5$ | $D_6$ | $D_7$ |
| Control Block Formats: | | Block Type Field | | | | | | | |
| $C_0 C_1 C_2 C_3/C_4 C_5 C_6 C_7$ | 10 | 0x1e | $C_0$ | $C_1$ | $C_2$ | $C_3$ | $C_4$ | $C_5$ | $C_6$ | $C_7$ |
| $C_0 C_1 C_2 C_3/O_4 D_5 D_6 D_7$ | 10 | 0x2d | $C_0$ | $C_1$ | $C_2$ | $C_3$ | $O_4$ | $D_5$ | $D_6$ | $D_7$ |
| $C_0 C_1 C_2 C_3/S_4 D_5 D_6 D_7$ | 10 | 0x33 | $C_0$ | $C_1$ | $C_2$ | $C_3$ | $S_4$ | $D_5$ | $D_6$ | $D_7$ |
| $O_0 D_1 D_2 D_3/S_4 D_5 D_6 D_7$ | 10 | 0x66 | $D_1$ | $D_2$ | $D_3$ | $O_0$ | $S_4$ | $D_5$ | $D_6$ | $D_7$ |
| $O_0 D_1 D_2 D_3/O_4 D_5 D_6 D_7$ | 10 | 0x55 | $D_1$ | $D_2$ | $D_3$ | $O_0$ | $O_4$ | $D_5$ | $D_6$ | $D_7$ |
| $S_0 D_1 D_2 D_3/D_4 D_5 D_6 D_7$ | 10 | 0x78 | $D_1$ | $D_2$ | $D_3$ | $D_4$ | $D_5$ | $D_6$ | $D_7$ | |
| $O_0 D_1 D_2 D_3/C_4 C_5 C_6 C_7$ | 10 | 0x4b | $D_1$ | $D_2$ | $D_3$ | $O_0$ | $C_4$ | $C_5$ | $C_6$ | $C_7$ |
| $T_0 C_1 C_2 C_3/C_4 C_5 C_6 C_7$ | 10 | 0x87 | $C_1$ | $C_2$ | $C_3$ | $C_4$ | $C_5$ | $C_6$ | $C_7$ | |
| $D_0 T_1 C_2 C_3/C_4 C_5 C_6 C_7$ | 10 | 0x99 | $D_0$ | $C_2$ | $C_3$ | $C_4$ | $C_5$ | $C_6$ | $C_7$ | |
| $D_0 D_1 T_2 C_3/C_4 C_5 C_6 C_7$ | 10 | 0xaa | $D_0$ | $D_1$ | $C_3$ | $C_4$ | $C_5$ | $C_6$ | $C_7$ | |
| $D_0 D_1 D_2 T_3/C_4 C_5 C_6 C_7$ | 10 | 0xb4 | $D_0$ | $D_1$ | $D_2$ | $C_4$ | $C_5$ | $C_6$ | $C_7$ | |
| $D_0 D_1 D_2 D_3/T_4 C_5 C_6 C_7$ | 10 | 0xcc | $D_0$ | $D_1$ | $D_2$ | $D_3$ | $C_5$ | $C_6$ | $C_7$ | |
| $D_0 D_1 D_2 D_3/D_4 T_5 C_6 C_7$ | 10 | 0xd2 | $D_0$ | $D_1$ | $D_2$ | $D_3$ | $D_4$ | $C_6$ | $C_7$ | |
| $D_0 D_1 D_2 D_3/D_4 D_5 T_6 C_7$ | 10 | 0xe1 | $D_0$ | $D_1$ | $D_2$ | $D_3$ | $D_4$ | $D_5$ | $C_7$ | |
| $D_0 D_1 D_2 D_3/D_4 D_5 D_6 T_7$ | 10 | 0xff | $D_0$ | $D_1$ | $D_2$ | $D_3$ | $D_4$ | $D_5$ | $D_6$ | |

| S H | Byte 0 /S/ | Byte 1 /D/ | Byte 2 /D/ | Byte 3 /D/ | Byte 4 /D/ | Byte 5 /D/ | Byte 6 /D/ | Byte 7 /D/ |

| S H | Byte 0 /I/ | Byte 1 /I/ | Byte 2 /I/ | Byte 3 /I/ | Byte 4 /S/ | Byte 5 /D/ | Byte 6 /D/ | Byte 7 /D/ |

FIG. 4 PRIOR ART

ENCODING FOR EFFICIENT USE OF AN UPSTREAM CHANNEL IN BURST MODE

CROSS REFERENCE TO EXISTING APPLICATIONS

This application claims priority from U.S. Provisional Patent Application No. 60/888,325 filed Feb. 6, 2007, which is incorporated herein by reference in its entirety.

FIELD OF THE INVENTION

The invention relates generally to data access systems, and more particularly to the operation of a communication system that uses burst mode upstream multiplexing and in which an encoding scheme exhibits variable frame alignment.

BACKGROUND OF THE INVENTION

In an Ethernet network, all nodes generate frames in the well-known Ethernet format. However, before transmission on the physical medium, the segments of data making up a frame are converted into transmittable units that are specially tailored for the particular transmission medium on which Ethernet is operating. This segmenting and conversion procedure is called "encoding". In modern (i.e. full duplex) Ethernet systems, encoding is done continuously (i.e. even if no frame data is being transmitted). Symbols called IDLEs (written as /I/) are encoded and transmitted in the absence of frame data.

The "64B/66B transmission code" is an encoding scheme used in fiber-based 10 Gb/s Ethernet systems and described in detail in the IEEE 802.3-2005 standard. This form of encoding performs the following steps before transmission: segments the transmittable frames and interframe gap data into units of 8 bytes, encodes some control information (see FIG. 1), scrambles the 64 bit units to obtain DC balance and prepends a 2-byte control header (see FIG. 2). The 8 byte granularity of the payload leads to inefficiencies in certain topologies, as described in detail below.

Performance over certain transmission media benefits from the employment of Forward Error Correction (FEC). FEC operates over a specific quantity ("block") of input data and results in a specific amount of parity data. The parity data is extra overhead that must be included in the data transmission stream. This can be done in various ways. One approach for employing FEC in Ethernet is a scheme like the one shown in FIG. 3. In this scheme, FEC is applied to a sequence of encoded 66b blocks. The parity is then divided into 64 bit payloads, and each 64 bit payload is prepended with a 2 bit header. These parity blocks are then inserted into the data stream following the sequence of encoded blocks that are being corrected.

Demand Assignment Multiple Access (DAMA) is a method for resource management in a data communication medium. DAMA enables attachment of a "headend" node (typically belonging to a service provider) and a number of "secondary" nodes (typically belonging to service subscribers). With DAMA (in conjunction with Time-Division Multiplexing or TDM), the headend node controls which network element is allowed to transmit at a given time.

"DOCSIS", "IEEE 802.16", and "IEEE 802.3 Ethernet in the First Mile" are examples of networking technologies using Time-Division DAMA mechanisms. A control protocol will typically be defined for a specific DAMA network to enable the secondary nodes to indicate their transmission bandwidth requirements to the headend (i.e. the "demand") and for the headend to signal the "assignments" of transmission slots. All three of the networking technologies mentioned above use DAMA in a point-to-multipoint (P2MP) topology.

In a P2MP network with TDM-based DAMA, the headend node directly controls the flow of data on the downstream channel (which is received by all of the secondary nodes). The headend also assigns time slots on the upstream channel to particular secondary nodes for their transmissions, as well as "contention slots" in which a secondary node can transmit spontaneously. The upstream transmission of a secondary node within a TDM slot is referred to as a "burst".

An Ethernet Passive Optical Network (EPON) is an Ethernet network implemented on a P2MP topology over fiberoptic media. The headend node is called the Optical Line Terminal (OLT) and the secondary node is called the Optical Network Unit (ONU). As in other P2MP networks, an EPON OLT transmits over a downstream channel received by all ONUs and assigns transmission slots on the upstream channel to specific ONUs based on their indicated needs for transmission bandwidth. Traditional Ethernet networking technology is oriented to either shared-media (half-duplex Ethernet) or point-to-point media (full-duplex Ethernet). With the introduction of P2MP architecture and DAMA to Ethernet, Ethernet protocols began to be updated for operation in so-called "burst mode".

A number of problems arise in a system that uses burst mode upstream multiplexing and an encoding scheme that exhibits variable frame alignment. The latter refers to an encoding/framing mechanism in which the number of encoded blocks occupied by a particular series of frames is variable due to unused space in the first block, for example in the 64B/66B code. Here, the number of encoded blocks occupied depends on the alignment of the start-of-frame (/S/) code in the first 66b block. One problem (shown in FIG. 4) is that if the /S/ of a 64-byte frame appears in column 0, the frame will occupy 8 encoded blocks, whereas if the /S/ appears in column 4, the frame will occupy 9 encoded blocks.

Another problem is the underutilization of resources at the end of the burst. When an encoding scheme with variable frame alignment is employed in burst mode, there can be, depending on the frame alignment, unutilized transmission resources (i.e. unused upstream transmission time) corresponding to one encoded block minus one alignment quantum worth of transmission time. Specifically, in the case of 64B/66B encoding, if the /S/ of the first frame in the burst appears in column 4, and if the /T/ of the final frame of the burst appears in column 0, 1, 2, or 3, then the final 4 bytes of the burst are wasted (whereas in regular non-burst mode they would have carried required interframe gap). The extent of the underutilization is much more significant in networks which have a longer encoded block. This would include a network which (in addition to the functions already described) also employs a block-oriented, overhead-generating function (e.g. FEC with systematic framing as described above) to the transmitted stream.

Consider the case of 64B/66B encoding with systematic FEC framing as shown in FIG. 3. The number of encoded blocks (including parity) occupied by the burst depends on the alignment of the /S/ code in the first 66b block. Assume that there are 27 data blocks and 4 parity blocks in a FEC Codeword. If the /S/ of a 216-byte frame appears in column 0, the single-frame burst will occupy 31 encoded blocks (one FEC codeword), whereas if the /S/ appears in column 4, the burst will occupy 62 encoded blocks (two FEC codewords). As in the previous example, 1 FEC codeword minus 4 bytes worth of transmission time has been wasted.

The Multipoint Control Protocol (MPCP) performs control operations for EPON (including upstream transmission slot control). A MPCP REPORT message is sent by the ONU to the OLT to indicate upstream transmission bandwidth requirements, and a GATE message is sent from the OLT to ONU to indicate the upstream transmission slot assignment. The REPORT message of an EPON's MPCP informs the OLT of the ONU's bandwidth requirements (including encoding and FEC overhead). When the upstream channel operates in burst mode using encoding with variable frame alignment and with FEC, the ONU's eventual bandwidth requirement actually depends on which column the first /S/ falls in. As noted above, this variation is equivalent to just under one full FEC codeword. Consequently, the bandwidth value to be included in the REPORT would need to be the "worst case" (i.e. larger) value in order to guarantee that the grant in the OLT's GATE would be long enough for the burst.

In summary, employing encoding with variable frame alignment together with block-oriented FEC in a burst mode network leads to intermittent underutilization of resources. The request/grant mechanism typical of DAMA networks (as exemplified by REPORT/GATE in EPON) necessitates adopting the "underutilized" case as the norm for bandwidth reservations, in order for network behavior to remain predictable. This means underutilization will occur in every burst. Therefore, it is desirable to alter the encoding behavior performed at the beginning of the burst for efficient use of an upstream channel that leads to leads better utilization of resources.

Ethernet devices consist of two modules which communicate across a bus called the "Media Independent Interface", as well known in the art. An EPON 10G ONU being an Ethernet device, its 2 highest-level component modules communicate across a 36-bit 10G Media Independent Interface (XGMII). The XGMII need not be physically present in the ONU device—however the ONU must exhibit the same externally visible behavior as it would if the XGMII were physically present.

Among the modules in known 10G EPON ONUs located above the XGMII are the following: a MAC layer (which enqueues transmittable frames); a MAC Control (which receives GATE messages from the OLT and signals to the MAC layer when the time to transmit has arrived); and a Reconciliation Sublayer (which transmits frame data across the XGMII during bursts and interframe gap codes between bursts as well as between frames during a burst). Among the modules located below the XGMII is a Physical Coding Sublayer (which includes the 64B/66B encoder and the FEC encoder). The encoders and other components of the Physical Coding Sublayer operate continuously and synchronously at a particular clock rate.

SUMMARY OF THE INVENTION

The invention relates to burst mode upstream multiplexing in a DAMA data network having a headend and a plurality of secondary nodes, in which an encoding scheme exhibits variable frame alignment. The invention provides "alignment-enabled" secondary nodes (e.g. ONUs in EPON) which monitor the alignment of for-transmission data as it is received, and actively align the data frames into the encoded blocks, such that the number of blocks occupied by encoded data resulting from an unencoded datastream (consisting of a series of frames and interframe gaps) of a particular length is predictable rather than variable. In particular, the beginning of the frame data (e.g. /S/ as used in Ethernet) is aligned in a manner that results in a predictable number of encoded blocks. This can be done for example by aligning /S/ to the beginning of the encoded Ethernet 66b block. The control protocol and bandwidth assignment algorithms in the headend and secondary nodes recognize and rely on the now-fixed overhead of encoding done by the secondary node, so that upstream transmission slots can be assigned efficiently. Consequently there are no longer underutilized transmission slots for burst data and there is no longer a need to over-report bandwidth requirements.

The secondary nodes may buffer and delay data before encoding, for example as done in a "queue below XGMII" implementation of an alignment-enabled ONU, described below. The secondary nodes may synchronize data transmission with the encoder clock cycle, or perform processing to eliminate transmission-timing-dependent variation in the number of codewords output for a specific length of user data, so that the number of encoded blocks resulting from a data transmission (burst) of a particular length by a secondary node is predictable and not affected by alignment-related considerations.

The invention is applicable to the co-deployment of several existing technologies: Ethernet Passive Optical Networks and burst mode (IEEE 802.3-2005), 64B/66B encoding for Ethernet (IEEE 802.3-2005) and Forward Error Correction (ITU G.975 and G.709). Networks with DAMA topology which do not use an encoding with variable frame alignment include DOCSIS 1.0 and IEEE 802.16e-2005.

The invention provides a method for efficient use of an upstream channel in burst mode in a DAMA data communication system, the data communication system including a headend node coupled to a plurality of secondary nodes, the method including the steps of: a) at a secondary node, monitoring alignment of a data burst as it is line-encoded for transmission in a respective assigned TDM slot; b) aligning data frames into encoded blocks so that the number of blocks occupied by encoded burst data is predictable rather than variable; and c) transmitting the encoded blocks to the headend node of the network.

In some embodiments of the method, the network is an Ethernet optical network, and the step of aligning data frames includes encoding a start-of-frame (/S/) code to a first byte of a first encoded Ethernet 66b block In some embodiments of the method in which the network is an Ethernet optical network, the step of aligning data frames includes aligning a XGMII word that includes a start control code to a first position in a 72 bit word input to a 66B/66B encoded block.

In some embodiments of the method, the encoding of a /S/ code includes removing interframe gap codes at the beginning of a burst.

In some embodiments of the method, the step of transmitting includes starting frame transmission at a time that guarantees that no leading interframe gap codes precede In some embodiments of the method, the aligning of a XGMII word further includes checking the XGMII word to see if it includes the start control code and if yes, saving the XGMII word in a given variable, waiting for the next XGMII word and assembling the 72 bit input word for forwarding to the 64B/66B encoder The invention provides a DAMA data communication system that includes: a) a headend network element; b) a plurality of secondary alignment-enabled network elements; and c) a shared TDM channel managed by the headend element and used for upstream transmission of encoded data from each secondary alignment-enabled network element to the headend element in burst mode and wherein the data frames are aligned into encoded blocks by each secondary alignment-enabled network element so that the number of blocks occupied by encoded data is predictable rather than variable.

In some embodiments of the system, the network includes an Ethernet passive optical network (EPON), wherein the headend network element includes an optical line terminal (OLT) and wherein each secondary alignment-enabled network element includes an alignment-enabled optical network unit (ONU).

In some embodiments of the system, the EPON is a 10 Gb/s EPON.

In some embodiments of the system, each alignment-enabled ONU includes an encoder module that implements a 64B/66B transmission encoding mechanism on the TDM channel, in which the number of encoded blocks transmitted on the media for a specific sequence of user data is variable and depends on transmission timing; a forward error correction (FEC) encoder module that inserts 66b blocks containing FEC parity data following a systematic framing format; a control module that implements a MAC control entity that requests that the headend assign a TDM allocation of a particular duration on the TDM channel; and an aligner module that buffers data before encoding and selectively deletes interframe gap codes.

BRIEF DESCRIPTION OF THE DRAWINGS

The invention is herein described, by way of example only, with reference to the accompanying drawings, wherein:

FIG. 1 shows 64B/66B block formats according to IEEE 802.3-2005;

FIG. 4 shows a prior art procedure for alignments of /S/ in a 66b block;

DETAILED DESCRIPTION OF THE INVENTION

The invention provides, in various embodiments, systems and methods of encoding for efficient use of an upstream channel in burst mode. The invention is described in detail and exemplarily for EPON using 64B/66B encoding, although is should be clear that it is equally applicable to other networks such as First Mile Ethernet over twisted pair copper.

Figure 6:
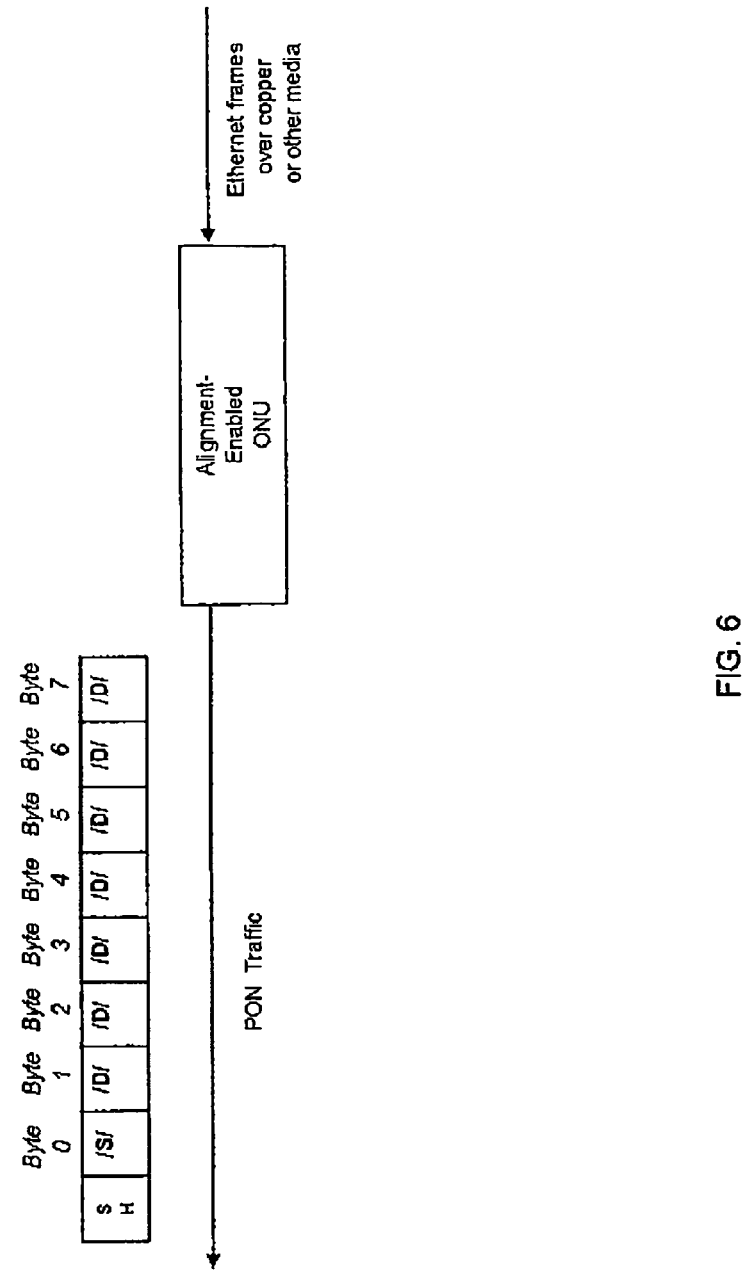
FIG. 6 shows an alignment-enabled ONU of the invention which ensures that /S/ appears predictably at the beginning of an upstream burst.

In the invention, each ONU in the PON is an "alignment-enabled ONU", i.e. an ONU which performs special processing to remove (or otherwise ensure the absence of) interframe gap codes at the beginning of the burst so that the start of frame (/S/) appears in column 0 of the first 66b block (see FIG. 6). This guarantees that the number of transmitted codewords is the smallest number possible for the length of the transmitted user data (where the user data consists of frames and interframe gap codes). In so doing, the ONU also makes the number of transmitted codewords for a given length of transmitted user data predictable. Consequently, since the encoding scheme used by an alignment-enabled ONU is both predictable and optimally efficient, the bandwidth request/bandwidth grant exchange (i.e. the EPON REPORT/GATE messages) will base their bandwidth allocations on the requirements of this optimum and predictable number of codewords.

Figure 5:
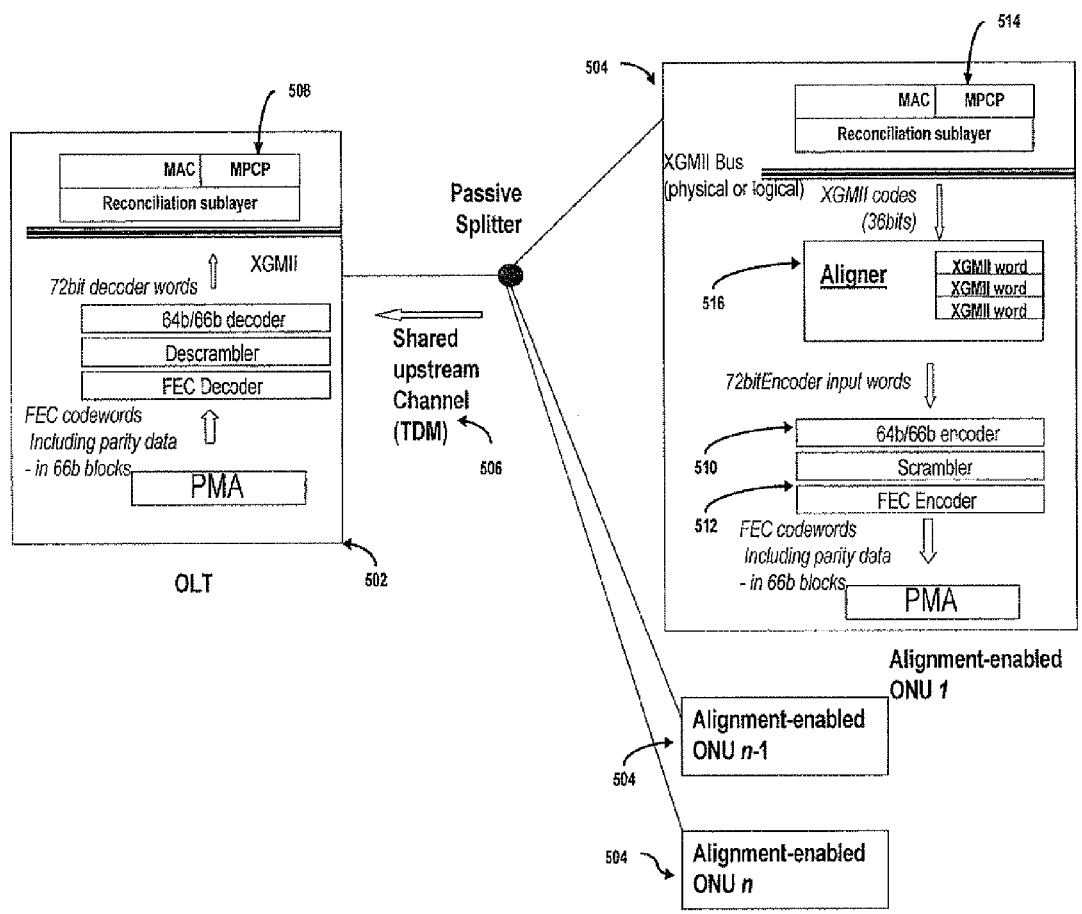
FIG. 5 shows an embodiment of a system of the invention.

An "alignment-enabled ONU" includes a logical aligner or "alignment function" between the (physical or logical) XGMII interface and the encoder module (see FIG. 5). The alignment function can be implemented in different ways, described in more detail hereinbelow, and is responsible for ensuring alignment of the start-of-frame to the start of an encoded block. In contrast, known art ONUs do not ensure alignment of the start-of-frame to the start of the encoded block. As mentioned above, a known art ONU transmits bursts in which the /S/ appears in either column 0 or column 4, depending on timing interaction of the MAC Control and encoder modules. The appearance of /S/ in column 4 may necessitate the use of an additional 66b block for the burst (depending on the alignment of the final frame). The additional 66b block may then necessitate using an additional FEC codeword (depending on the alignment of the 66b blocks in the FEC codewords).

Alignment-Enabled PON

Figure 2:
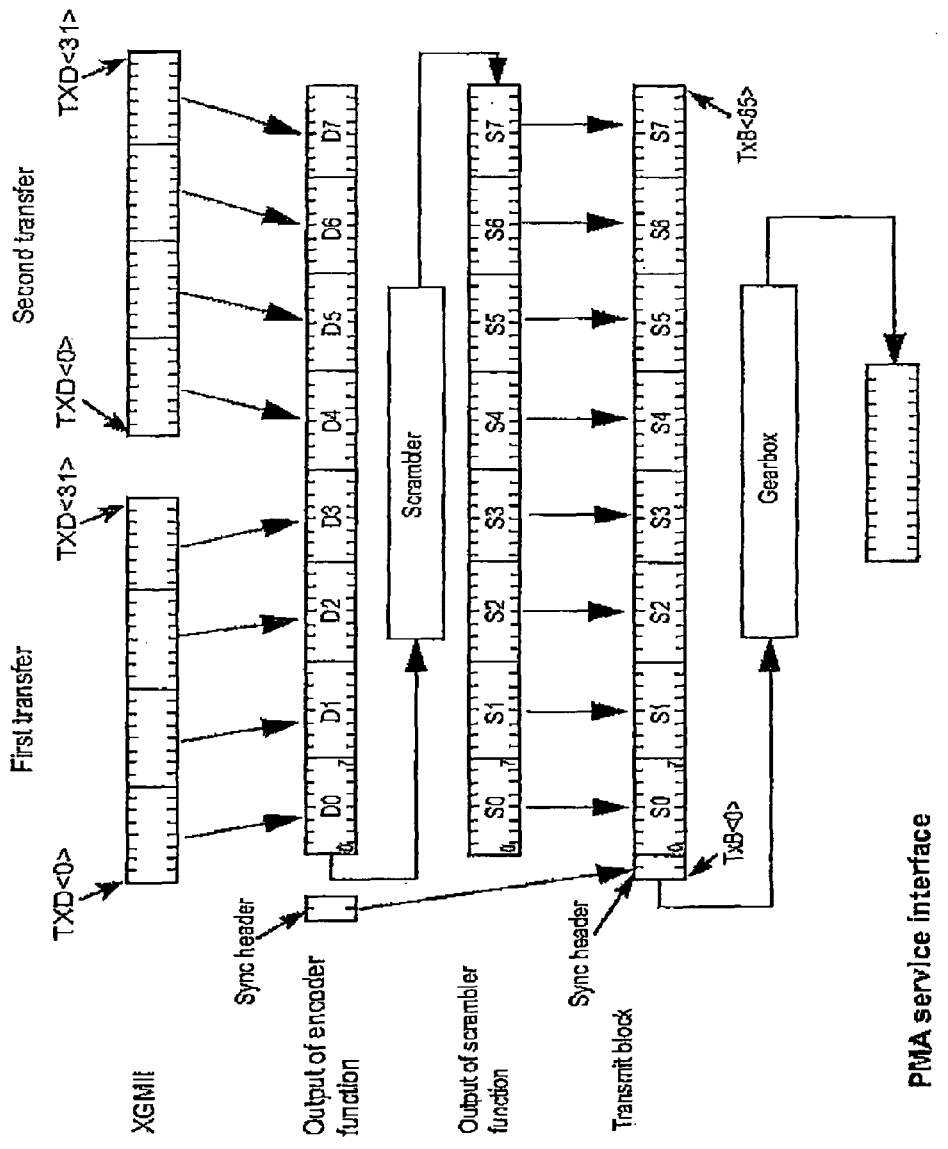
FIG. 2 shows steps of the 64B/66B encoding process according to IEEE 802.3-2005.
Figure 3:
FIG. 3 shows prior art "systematic" FEC framing, in which parity follows in 66b blocks following the data corrected by it.

FIG. 5 shows an exemplary embodiment of a system implemented in a 10 Gb/s EPON in both the upstream and downstream directions. The system includes a headend Optical Line Terminal (OLT) 502 coupled to a plurality of alignment-enabled ONUs 504 1-n; a time-division multiplexed (TDM) channel 506 for upstream transmissions managed by the headend element; a control module 508 in the OLT that implements a MPCP control mechanism to enable a TDM allocation of a particular duration on the shared channel; and, in each alignment-enabled ONU: an encoder module 510 that implements the 64B/66B transmission encoding mechanism (on the TDM channel) in which the number of encoded blocks transmitted on the media for a specific sequence of user data is variable and depends on transmission timing; a FEC encoder module 512 that inserts 66b blocks containing FEC parity data following a systematic framing format (for example as shown in FIG. 3); a control module 514 that implements the MPCP control mechanism which requests that the headend assign a TDM allocation of a particular duration on the shared channel; and an aligner module 516 to buffer data before encoding and selectively delete interframe gap codes.

Efficient Use of Upstream Channel via ONU Frame Alignment

Figure 7:
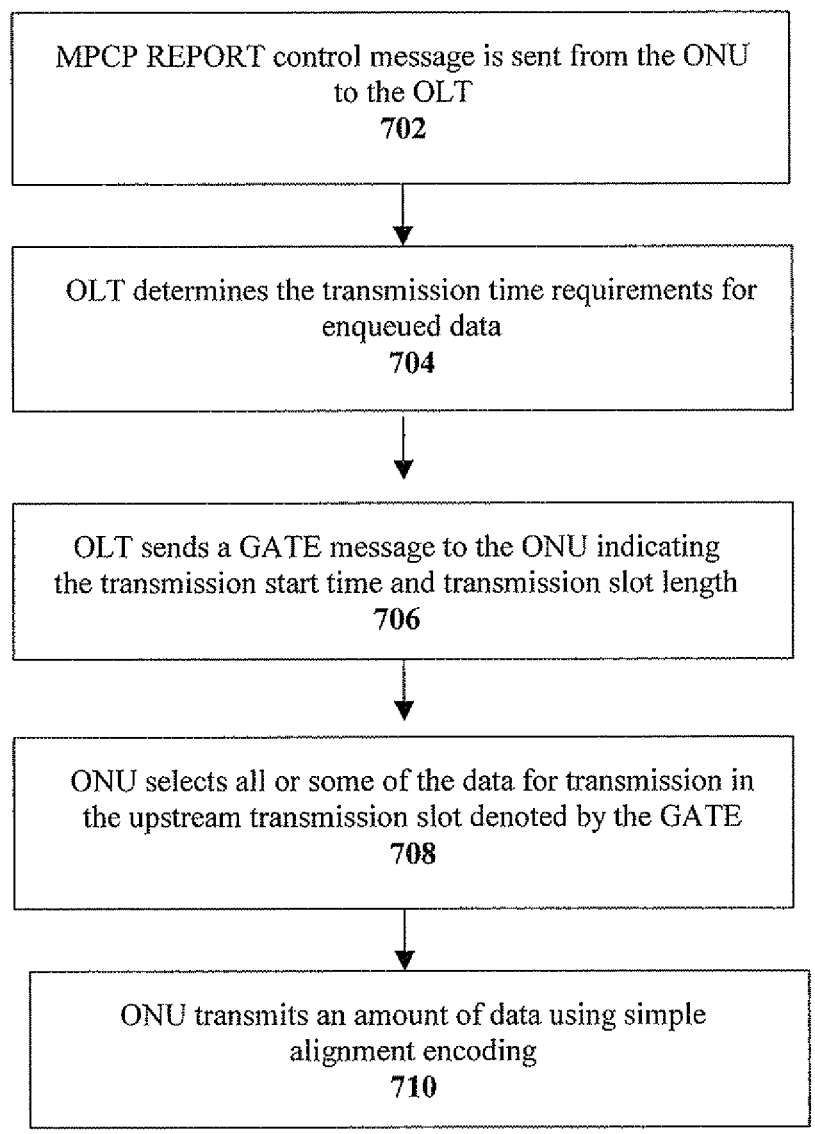
FIG. 7 shows steps of a procedure followed by the ONU and the OLT in the method of the invention.

The procedure followed by the ONU and the OLT is outlined in FIG. 7. The ONU is aware of the algorithm used for aligning data to codewords. For example, in an embodiment of "simple alignment", the bandwidth requirement for data of length is:

$$\text{length} + \text{Ceiling}\left[\left[\left[\left[\text{Ceiling}(\text{length}/216)\right]*318\right]+\text{PreambleBits}\right]/\text{BitTimesPerTQ}\right]$$

where PreambleBits=66 and BitTimesPerTQ=165. The ONU sets the value in REPORT accordingly. The value is for example a field in the REPORT (IEEE 802.3-2005 section 64.3.6.2)) that gives the bandwidth requirement in units of 16 nanoseconds The MPCP REPORT control message is sent from the ONU to the OLT in step 702. The REPORT includes a measurement of the bandwidth requirements for the ONU transmission including FEC and coding overhead. The OLT computes the transmission is time requirements for enqueued data in step 704. Optionally, the OLT computes and adds the FEC and coding overhead to the transmission time requirements. The OLT then sends a GATE message to the ONU indicating the transmission start time and transmission slot length in step 706. The ONU selects all or some of the data for transmission in the upstream transmission slot denoted by the GATE in step 708 and transmits an amount of data using the "simple alignment encoding" in step 710. The alignment of the start-of-frame (/S/) to the start of an encoded block is performed by the ONU in this step prior to the transmission.

Example

Alignment of Data Frame in Burst Using a FIFO Located Below XGMII

Figure 8:
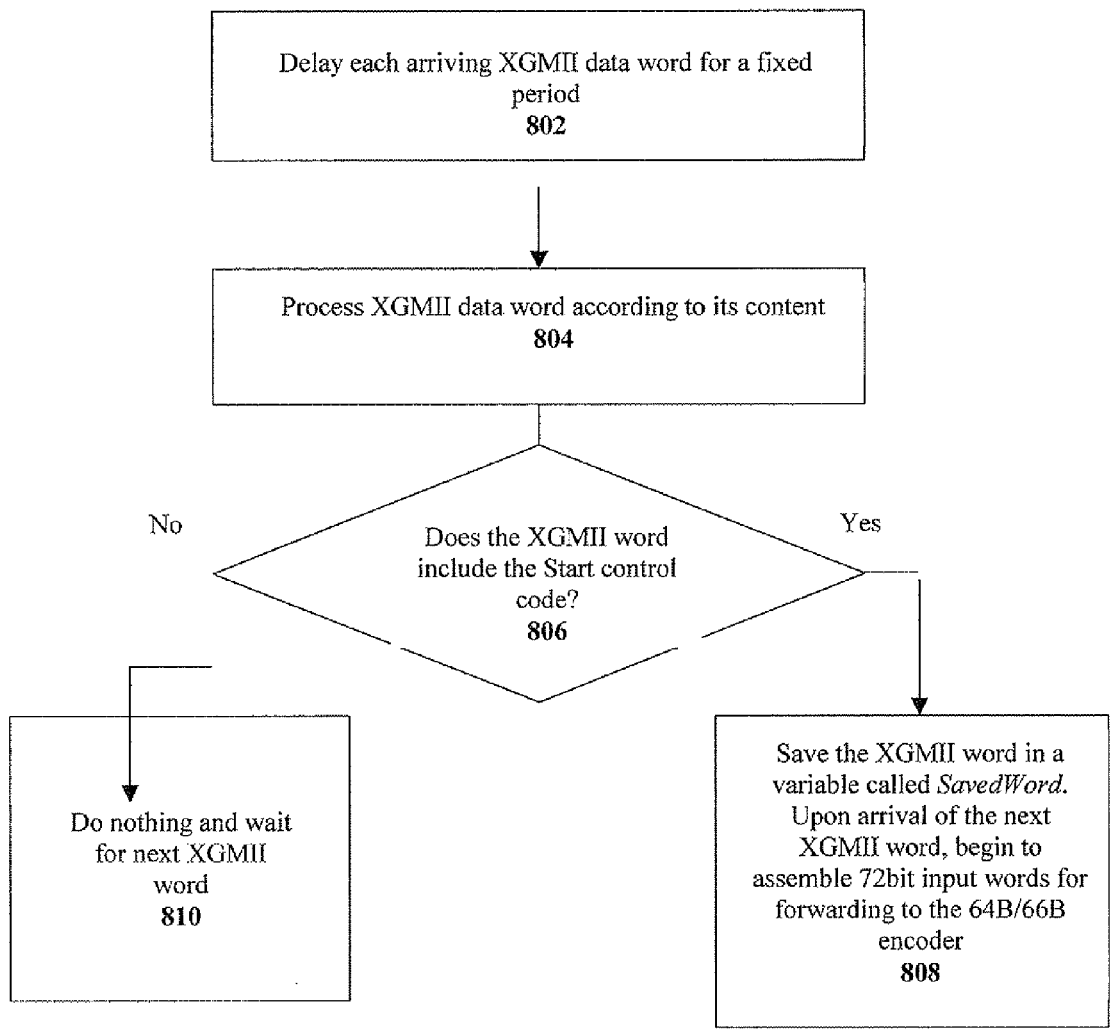
FIG. 8 shows one embodiment of exemplary actions occurring in step 710 in FIG. 7.

FIG. 8 shows an embodiment of exemplary actions occurring in step 710 above, i.e. describes the transition from "between burst" state to "in burst" state. The data selected by the ONU in step 708 above is unaligned stream of codes received across an XGMII bus (see FIG. 5). The output is a stream of 72 bit inputs to the 64B/66B encoder in which the start-of-frame always appears in the first of the 8 data positions. The ONU maintains a fixed-length FIFO (not shown) of XGMII words received for encoding via the internal (physical or logical) XGMII; accordingly the ONU delays each XGMII word a fixed time period in the FIFO before processing. The following steps ensure that that the 66b blocks and FEC frames begin with frame data and not IDLE (or other non-data) codes:

Step 802: Each data word arriving synchronously over the XGMII is delayed for an amount of time that will not substantially affect frame latency, e.g. 100 ps. During the period prior to the start of data, initialization tasks (e.g. laser stabilization or descrambler synchronization) may take place via external mechanisms.

Step 804: At the end of the delay period, each XGMII word is processed according to its content.

Step 806: The XGMII word is checked to see if it includes the Start control code.

Step 808: If the XGMII word includes the Start control code, the XGMII word is saved in a variable called SavedWord. Now that the first frame in the burst has been found (from the fact that the XGMII word includes the Start control code), we wait for the next XGMII word and begin to assemble 72 bit input words for forwarding to the 64B/66B encoder (see FIG. 9).

Step 810: If the XGMII word does not include the Start control code, nothing is done (XGMII word is dropped). The process waits for a next XGMII word, which arrives eventually and is handled as in the beginning of the loop.

Figure 9:
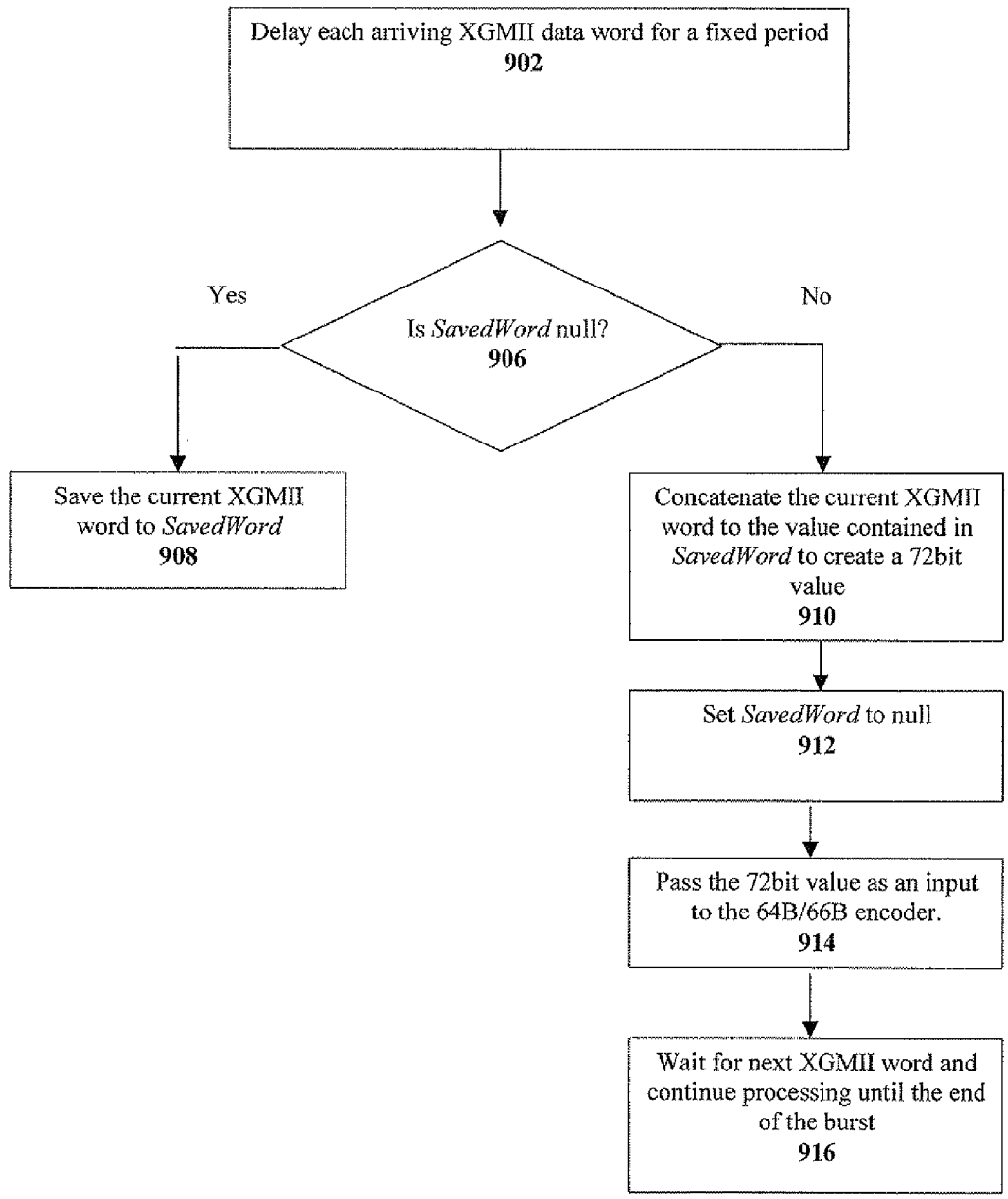
FIG. 9 shows an embodiment of exemplary actions occurring in step 808 in FIG. 8

FIG. 9 shows an embodiment of exemplary actions occurring in step 808 above. After the XGMII word including the Start control code has been identified, the following steps couple each pair of arriving XGMII words into a 64B/66B encoder input with the requisite alignment.

In step 902, each data word arriving synchronously over the XGMII is delayed for an amount of time that will not substantially affect frame latency e.g. 100 ps. The XGMII word is processed according to the value of SavedWord. The value of SavedWord is checked in step 906. If SavedWord is null, the current XGMII word is saved to SavedWord in step 908. If SavedWord is not null, the current XGMII word is concatenated to the value contained in SavedWord to create a 72 bit value in step 910. SavedWord is then set to null in step 912 and the 72 bit value is passed as an input to the 64B/66B encoder in step 914. The process then waits for the next XGMII word and continues until the end of the burst in step 916.

All publications mentioned in this specification are herein incorporated in their entirety by reference into the specification, to the same extent as if each individual publication was specifically and individually indicated to be incorporated herein by reference.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention. In addition, citation or identification of any reference in this application shall not be construed as an admission that such reference is available as prior art to the present invention.

What is claimed is:

1. A method of data communications between a headend node and a plurality of secondary nodes, the method providing an efficient use of an upstream channel in burst mode with a variable number of data frames, the method comprising the steps of:
   a) monitoring a variable length data burst at one of the secondary nodes in a demand assignment multiple access (DAMA) data communication system, as said data burst is packed into the variable number of data frames for transmission in a respective assigned TDM slot;
   b) aligning the variable number of data frames into a variable number of encoded blocks defining a variable transmission time, said aligning aligns a start-of-frame (/S/) of the variable number of data frames to a start of said variable number of encoded blocks, said variable number of encoded blocks being deterministically derived from said variable number of data frames and is predictable by the headend node; and
   c) transmitting said variable number of encoded blocks from said one secondary node to the headend node of the data communication system via the upstream channel.

2. The method of claim 1, wherein the data communication system is an Ethernet optical network, and wherein the step of aligning data frames includes encoding said start-of-frame (/S/) code to a first byte of a first encoded Ethernet 66b block.

3. The method of claim 2, wherein the step of aligning data frames further includes aligning an XGMII word that includes a start control code to a first position in a 72 bit word input to a 66B/66B encoded block.

4. The method of claim 3, wherein aligning an XGMII word further includes
   i) checking the XGMII word to see if the XGMII word includes said start-of-frame (/S/) code and if yes,
   ii) saving the XGMII word in a given variable,
   iii) waiting for the next XGMII word, and
   iv) assembling the 72 bit input word for forwarding to the 64B/66B encoder.

5. The method of claim 2, wherein the encoding of said /S/ code includes removing interframe gap codes at the beginning of a burst.

6. The method of claim 2, wherein the step of transmitting includes starting frame transmission at a time that guarantees that no leading interframe gap codes precede said /S/ code in the first encoded Ethernet 66b block.

7. A system, comprising:
   a) a headend network node for a demand assignment multiple access (DAMA) data communication system;
   b) a plurality of secondary alignment-enabled network nodes; and c) a shared time-division multiplexed (TDM) channel managed by said headend node and used for upstream transmission of variable length burst data packed into a variable number of data frames from each said secondary alignment-enabled network node to said headend network node in burst mode and wherein said data frames are aligned into a variable number of encoded blocks by each said secondary alignment-enabled network node so that the variable number of said encoded blocks defines a variable transmission time, said data frames are aligned so that a start-of-frame (/S/) of said data frames to a start of said variable number of encoded blocks, said variable number of encoded blocks being deterministically derived from said variable number of data frames and is predictable by said headend network node.

8. The system of claim 7, wherein the DAMA data communication system includes an Ethernet passive optical network (ETON), wherein said headend network node includes an optical line terminal (OLT) and wherein each of said secondary alignment-enabled network node includes an alignment-enabled optical network unit (ONU).

9. The system of claim 8, wherein the EPON is a 10 Gb/s EPON.

10. The system of claim 8, wherein each said alignment-enabled ONU includes
  i) an encoder module that implements a 64B/66B transmission encoding mechanism on the TDM channel, in which the number of encoded blocks transmitted on the media for a specific sequence of user data is variable and defines the variable transmission timing,
  ii) a forward error correction (FEC) encoder module that inserts 66b blocks containing FEC parity data following a systematic framing format,
  iii) a control module that implements a MAC control entity that requests that the headend assign a TDM allocation of a particular duration on the TDM channel, and
  iv) an aligner module that buffers data before encoding and selectively deletes interframe gap codes.

\* \* \* \* \*

UNITED STATES PATENT AND TRADEMARK OFFICE
CERTIFICATE OF CORRECTION

PATENT NO. : 8,428,034 B2
APPLICATION NO. : 12/026570
DATED : April 23, 2013
INVENTOR(S) : Jeff Mandin Page 1 of 1

It is certified that error appears in the above-identified patent and that said Letters Patent is hereby corrected as shown below:

In the Claims:

Column 9:

Claim 8, line 18 should be corrected as follows:
Change:
-- work (ETON), wherein said headend network node includes --
to
"work (EPON), wherein said headend network node includes"

Signed and Sealed this
Eleventh Day of June, 2013

Teresa Stanek Rea
*Acting Director of the United States Patent and Trademark Office*